United States Patent [19]

van Kuik

[11] Patent Number: 4,821,956
[45] Date of Patent: Apr. 18, 1989

[54] METHOD FOR ADJUSTING THE TEMPERATURE IN A VEHICLE AND VEHICLE PROVIDED WITH SUCH A TEMPERATURE ADJUSTMENT

[76] Inventor: Rubertus J. P. van Kuik, Bachlaan 43, 5707 RN Helmond, Netherlands

[21] Appl. No.: 102,169

[22] Filed: Sep. 29, 1987

Related U.S. Application Data

[63] Continuation of Ser. No. 797,850, Nov. 14, 1985, abandoned.

[30] Foreign Application Priority Data

Nov. 17, 1984 [NL] Netherlands .................. 8403512

[51] Int. Cl.$^4$ .............................................. B60H 1/26
[52] U.S. Cl. .................................. 237/12.3 A; 98/10; 237/12.3 B
[58] Field of Search ................ 98/1.5, 2, 2.05, 10; 237/12.3 A, 12.3 B, 2 A, 12.4

[56] References Cited

U.S. PATENT DOCUMENTS

| | | | |
|---|---|---|---|
| 2,476,295 | 7/1949 | Hans | 98/10 |
| 2,794,383 | 6/1957 | Reynolds | 98/10 |
| 3,520,355 | 7/1970 | Rueth | 98/10 X |

FOREIGN PATENT DOCUMENTS

| | | |
|---|---|---|
| 1042902 | 11/1953 | France . |
| 2434724 | 3/1980 | France . |
| 1316429 | 5/1973 | United Kingdom . |

Primary Examiner—Harold Joyce
Attorney, Agent, or Firm—Ladas & Parry

[57] ABSTRACT

The system has air supply ducts extending within the vehicle and heating devices located generally toward the rear of the vehicle. The heating devices heat the air passing through the ducts. A suction pipe extends transverse of the side walls of the vehicle and communicates with air outside of the vehicle. Fans are connected between the suction pipe and the air ducts and between the inside of said vehicle and said air ducts, the fans being located near the floor and acting to suck air from the suction pipe and the inside of said vehicle and blow it into said air ducts past the heating devices. Temperature sensors are distributed about the inside of the vehicle and are operable to reduce or increase the blowing capabilities of one of said fans to control the amount of air being blown into said ducts.

28 Claims, 3 Drawing Sheets

4,821,956

METHOD FOR ADJUSTING THE TEMPERATURE IN A VEHICLE AND VEHICLE PROVIDED WITH SUCH A TEMPERATURE ADJUSTMENT

This is a continuation of co-pending application Ser. No. 797,850, filed Nov. 14, 1985, now abandoned.

TECHNICAL FIELD

The invention relates to a method for adjusting the temperature in a passenger room bounded by a floor, a roof and upright walls in a vehicle, in particular a motorcoach.

BACKGROUND

Vehicles such as motorcoaches and the like are also put in action quite frequently in cold conditions, such as e.g. in winter for conveying passengers to winter-sports areas and the like. In order to meet the requirements with regard to comfort it is necessary thereby that on the one hand an even temperature is maintained in the passenger room, whilst on the other hand it must be possible to exhaust stale air and supply fresh air continuously.

With known vehicles it appears impossible to do so and there is occurrence of draught near doors and emergency hatches, whilst further there is a bad distribution of heat in the vehicle and therefore large differences in temperature occur in the vehicle. In particular with the known coaches the temperature adjustment in the coach is thereby strongly influenced by the heating device located near the driver, which is adjusted by the driver dependent on his requirements, e.g. in connection with preventing the occurrence of mist on the windows and the like.

The invention now aims at effecting a method by means of which an even and pleasant temperature can be achieved in the coach while maintaining a regular air-change.

According to the invention this can be achieved because near both longitudinal sides of the vehicle, near the floor, air is supplied via an air heating device to the passenger room of the vehicle kept under excess pressure, whereby part of said air supplied via the air heating device is sucked from the inside of the vehicle and part of the air from the outside, whilst further outside air is supplied near the roof, all this in such a manner that the total quantity of outside air supplied per time unit is kept at least substantially constant, whilst the quantity of outside air led through the air heating device is regulated dependent on the quantity of heat to be supplied which is required.

When using the method according to the invention it will be possible to maintain the desired temperature in the passenger room while still sufficient outside air is constantly supplied, whereby the cold outside air supplied near the roof will soon mix with the rising hot air, so that supplying cold air at this spot does not result in discomfort for the passengers, while undesired occurrence of draught is also opposed by keeping the inside of the passenger room under excess pressure.

All this can be achieve in a simple manner in a vehicle provided with a passenger room bounded by a floor, a roof and upright walls as well as with an air heating device and fans by means of which air can be blown, via the air heating device, into air supply ducts extending along the floor, whereby according to the invention the vehicle is provided with a pair of air heating devices and air can be supplied via each air heating device by means of a pair of fans to an air supply duct extending along a side of the vehicle whereby by means of one of the fans air sucked from the passenger room is displaced and air sucked from the outside is displaced by the other fan, whilst near each side of the vehicle a further fan has been provided via which outside air can be supplied to an air supply duct located near the roof and extending into the longitudinal direction of the vehicle, and means have been provided which regulate the speed of revolutions of the fans supplying outside air dependent on the demand for heat in such a manner that with a decreasing demand for heated air to be supplied the speed of revolutions of the fan supplying outside air via the heating device decreases and the speed of revolutions of the other fan supplying outside air increases and with an increasing demand for heat the speed of revolutions of the fan supplying outside air via the heating device increases and the speed of revolutions of the other fan supplying outside air decreases all this in such a manner that the quantity of outside air supplied per time unit stays at least substantially constant.

THE FIGURES

The invention will be further explained hereinafter with reference to the accompanying diagrammatic figures.

DETAILED DESCRIPTION

Figure 1:
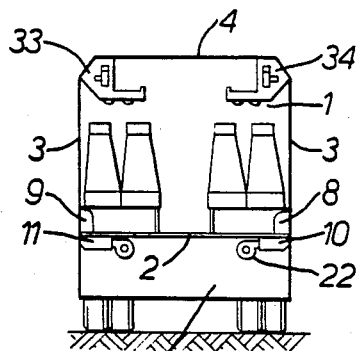
FIG. 1 is a diagrammatic cross section of a motorcoach according to the invention as taken from the rear.
Figure 2:
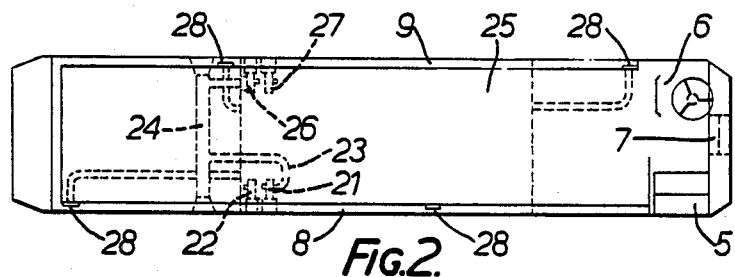
FIG. 2 is a diagrammatic top view of portions of the motorcoach.
Figure 3:
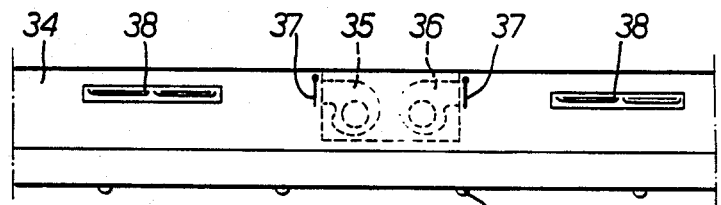
FIG. 3 is a view of an air supply duct located near the roof of the passenger room with fans arranged therein.

The vehicle diagrammatically illustrated in FIGS. 1 and 2 is here formed by a motorcoach or bus known by itself, comprising a passenger room 1, which is bounded by a floor 2, upright walls 3 and a roof 4. Near the front side of the bus an entrance door 5 has been provided, whilst also located there is the driver's seat 6.

Near the driver's seat an air heating unit 7 has been arranged which is provided with a radiator fed by cooling or circulating water of the engine 12 used for propelling the bus and with a fan, whilst said air heating device 7 can be adjusted by the driver to his requirements and dependent of the working conditions, e.g. to direct hot air along the front windows to prevent misting or fogging of said windows.

Figure 9:
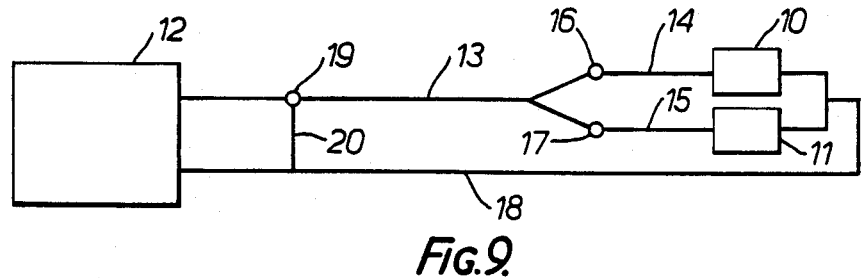
FIG. 9 shows diagrammatically the trajectory of cooling water pipes between a combustion engine and radiators of the air heating devices.
Figure 10:
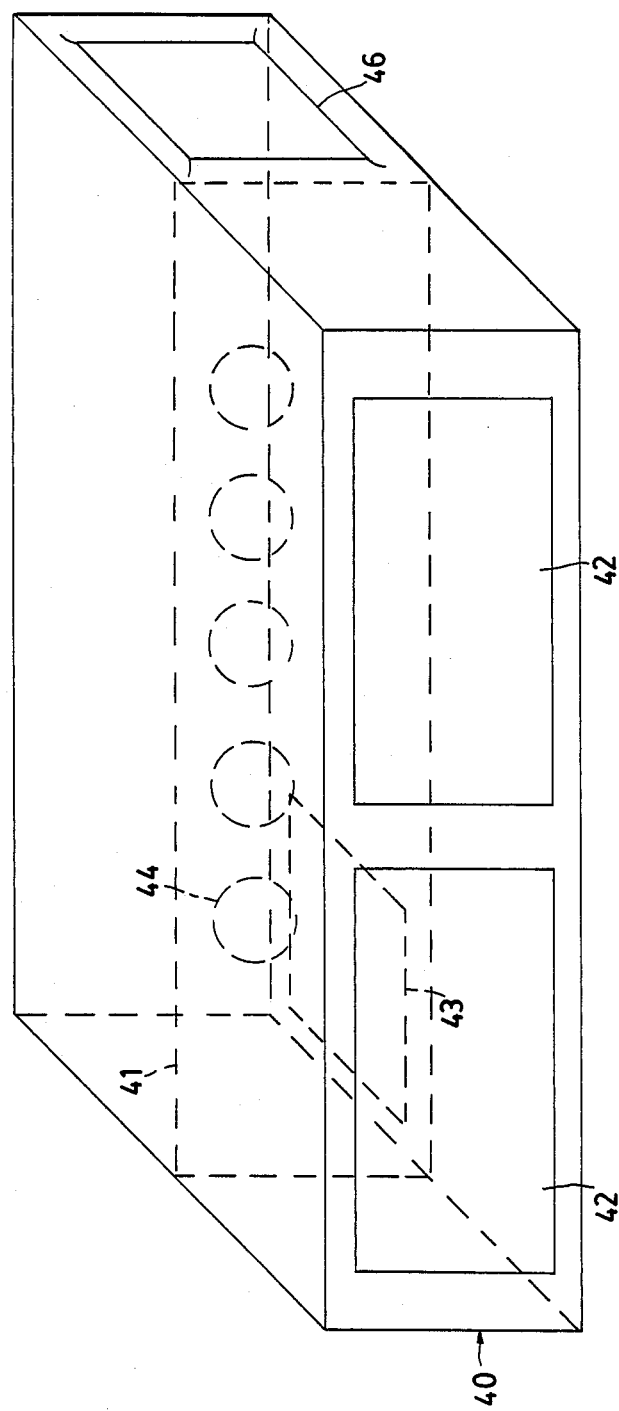
FIG. 10 is a schematic perspective sketch of the structure shown in FIGS. 7 and 8.

On both sides of the bus air supply ducts 8 and 9 have been provided along the side walls near the floor. Heated air can be supplied to either of said air supply ducts 8 and 9 via an air heating device 10, 11 respectively. The air heating device is formed by a radiator to which, as is diagrammatically illustrated in FIG. 9 circulating water can be supplied from the abovementioned engine 12 via a supply pipe 13 to which the heating devices 10 and 11 are connected via branch pipes 14, 15 respectively. An adjusting valve 16, 17 respectively has been provided to each of the branch pipes for the adjustment of the passage of hot circulating water from the combustion engine 12 to the heating devices 10 and 11. Said circulating water is led back to the engine via a return pipe 18.

A threeway valve 19 has been provided to the supply pipe 13. In a first position of said valve 19 the cooling water of the engine 12 will be led to the heating devices 10 and 11. In another position of said adjusting valve the supply of cooling water to the heating units 10 and 11 is shut off and the cooling water coming from the engine is passed on to the return pipe 18 direct via a connecting pipe 20.

Via the heating device 10 air can be supplied to the air supply duct 8 by means of a pair of fans 21 and 22. The fan 21 is connected, via a pipe 23, to a suction pipe 24, extending transverse to the longitudinal direction of the vehicle, the ends of pipe 24 having a direct communication with the outside air.

In the illustrated embodiment the fan 22 sucks air from a closed room 25, located under the passenger room, which e.g. can also be used for storing luggage.

In a similar manner air can be supplied to the air supply duct 9 via the air heating device 11 by means of a fan 26, which is also connected to the suction pipe 24 and by means of a fan 27, which sucks air from the room 25.

In the interior of the passenger room some air exhaust openings 28 have been provided near the floor, two on each side in the embodiment illustrated whereby said air exhaust openings have been accommodated in the air supply ducts 8, 9 respectively. The exhaust openings 28 open into a casing 29 to which an exhaust stub 30 has been connected. Connected to the exhaust stubs 30 are exhaust pipes 31, which open into the room 25. Only the casing to which the foremost exhaust opening 28 has been connected at the side of the air supply duct 8 opens directly into the room 25. It will be apparent that in this manner air sucked in from the interior under the passenger room by means of the fans 22 and 27 is again blown into the interior of the passenger room via the heating devices 10 and 11 as discussed further on in the specification.

Figure 6:
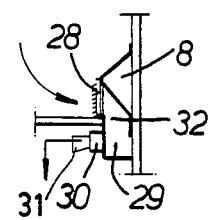
FIG. 6 is a cross section of FIG. 5.

As is further illustrated in FIG. 6 a temperature sensor 32 has been arranged in the casing 29 for a purpose to be more fully described hereinafter. In order not to let the temperature sensed by said sensor 32 to be influenced by the heated air supplied via the ducts 8 and 9 the casing 29 has been insulated relative to the air supply duct 8, 9 respectively by means of insulation material not further illustrated.

The fans 21,22 and 26,27 are provided with non-return valves at their exhaust sides, so that no air can flow back from the air supply ducts 8 and 9 via the fans when the fans are stationary.

Air supply ducts 33 and 34, extending into the longitudinal direction of the vehicle, have further been provided in the passenger room 1, near the roof at each side of the passenger room. Near the centres of said air supply ducts 33 and 34 a pair of fans 35 and 36 sucking outside air have been arranged which blow the air into the air supply ducts 33 and 34 in opposite directions. Thereby said fans, too, have been provided at their exhaust sides with diagrammatically illustrated non-return valves 37, which opposes the flow of air from the interior of the bus to the outside via said fans.

Figure 4:
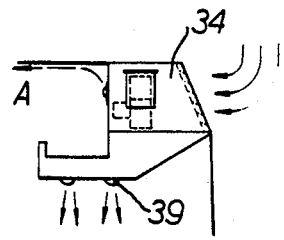
FIG. 4 is a cross section of FIG. 3.
Figure 5:
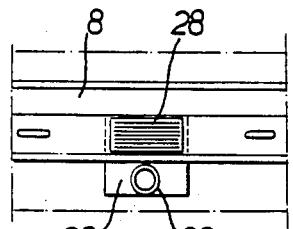
FIG. 5 shows part of an air supply duct located near the floor of the passenger room and extending into the longitudinal direction of the vehicle.

In the air supply ducts 33 and 34 regularly spaced exhaust openings 38, which cannot be shut off, have been provided, which have been constructed such that they direct the outflowing air along the roof, as is diagrammatically illustrated in FIG. 4 by means of the arrow A. Furthermore exhaust nozzles 39 to be operated by the passengers have been provided to the bottom sides of the air supply ducts in the usual manner.

Near the front side of the vehicle, under the floor, an air exhaust device has been arranged provided with a casing 40, which has been divided into two parts by means of a vertically standing partition 41. At the one side of the partition 41 grates 42 have been provided in the wall of the casing, via which air can flow from the interior of the passenger room into the casing 40. In the bottom of the casing 40 an exhaust grate 43 has been provided at the side of the partition 41 remote from the grates 42. In the partition 41 a number of passages 44 have been provided, which can be shut off by means of non-return valves 45, which only allow a flow of air in the direction of the grates 42 to the grate 43.

The room of the casing 44 comprising the exhaust grate 43 has been provided with a connecting stub 46, which has, direct or via a hose connected thereto, a direct communication with the front side of the bus. When driving a sucking action will occur at the exhaust grate 43, which has been provided near the bottom side of the casing 44 arranged with its longitudinal axis into the longitudinal direction of the bus. However, because air is supplied via the stub 46 owing to the arrangement described above a certain pressure will still be maintained in that portion of the casing 40 in which the exhaust grate 43 has been arranged, so that the non-return valves 45 can be opened only by overcoming said pressure and in this manner a certain excess pressure can be maintained in the interior of the passenger room.

The construction of the air supply ducts 8 and 9 and the connection of the fans 21,22 and 26, 27 respectively to said air supply ducts 8, 9 respectively is thereby such in the embodiment illustrated that via the front part of the air supply duct 9 are sucked from the interior and re-heated via the heating device 11 is supplied to the passenger room, whilst via the rear part of the air supply duct 9 air sucked from outside and led through the heating device 11 is supplied.

Via the front part of the air supply duct 8 air sucked from outside and led along heating unit 10 is also supplied to the interior of the motorcoach, whilst via the rear part of the air supply duct 8 air sucked from the interior of the coach and led along heating device 10 is led back into the interior of the coach. Furthermore, when the heating installation is in action, in each of the air supply ducts 33 and 34 located near the roof use is only being made of one of the fans 35 and 36, such that via the air duct 33 located at the same side as the air duct 9 air is supplied via the front part of the air duct 33, whilst via the air duct 34 located above the air supply duct 8 air is supplied to the interior of the motorcoach via the rear part of said air supply duct 34. The fan, which blows air into the rear part of air supply duct 33 or in the front part of air supply duct 34, respectively, is automatically shut off when the heating installation is in action.

The temperature level desired in the passenger room can be adjusted to a desired value e.g. between 16° C. and 26° C.

The actual temperature in the room is now measured in four Fan 27 sucks air from the interior 1,25. This air passes by heating unit 11 and is resupplied to the interior 1 of the coach. The speed at which fan 27 operates is controlled by means of the temperature sensor 32 which has been arranged near the front exhaust opening 28 which is arranged near the air supply duct 9.

Fan 22 sucks air from the interior 1,25. This air passes along heating unit 10 and is resupplied to the passenger room via the rear part of the air supply duct 8. The speed at which fan 22 operates is controlled by the temperature sensor near the rear part of air supply duct 8. If the temperature decreases to a level below the desired value more air will be displaced by means of said fans, whilst if the temperature increases to a level above the desired value the speed of revolutions of the fans will be reduced in order to displace less air.

By means of the two other sensors—i.e. the sensor 32 arranged near the front end of the air supply duct 8 near the relevant exhaust opening and by means of the sensor arranged near the rear end of the air supply duct 9—the be of fans 21 and 27 is controlled these fans supply outside air which is passed along the heating units 10 and 11 to the passenger room via the front part of the air supply duct 8 and the rear part of air supply duct 9, respectively. Also here the adjustment is such that if the sensor arranged near the front end of the air supply duct 8 senses too high a temperature the number of revolutions of the relevent fan 21 will be reduced, whilst if the temperature drops under a desired value the number of revolutions of the fan 21 will be increased gain. In a similar manner the number of revolutions of the fan 27 is adjusted.

To ensure that there will still be a sufficient supply of fresh air to the passenger room the number of revolutions of the air supply fan in the air supply duct 34 is adjusted dependent on the number of revolutions of the fan 21, such that on reducing the number of revolutions of the fan 21 the number of revolutions of the fan 35,36 in the air supply duct 34 being in action when the heating installation is being used is increased, all this in such a manner that a practically constant quantity of air is always sucked in and supplied to the interior of the passenger room by means of the two fans. In a similar manner the number of revolutions of the fan supplying the outside air via the air supply duct 33 when the heating installation is being used is adjusted dependent on the number of revolutions of the fan 26, so that also here said two fans supply a quantity of air to the passenger room of the bus that remains practically even per time unit. Usually about 1000 m³ outside air per hour is supplied to the passenger room.

It will be apparent that thus the temperature in various parts of the passenger room can be measured and on deflections from the temperature aimed at in the relevant part of the passenger room an influencing of said temperature can be effected, whilst also a regular and continuous supply of fresh air is provided.

Figure 7:
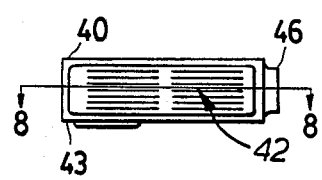
FIG. 7 is a side view of an air exhaust device to be arranged in the front of the vehicle.
Figure 8:
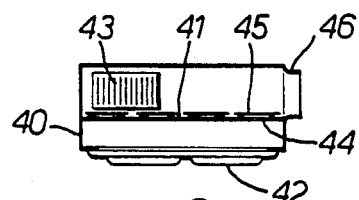
FIG. 8 is a cross section of the device illustrated in FIG. 7 as reoriented.

Thereby the air can only escape via the exhaust device 40 through 46 provided near the front side of the vehicle and illustrated in FIGS. 7-8. In the first place a certain excess pressure can always be maintained in the coach hereby, so that unpleasant occurrence of draught near doors, emergency hatches and the like can be prevented.

Because of this there is further more prevented a disadvantageous influencing of the climate in the passenger room as a result of the action of the heater 7 arranged near the driver, as the heat released from said heater 7 will be exhausted directly via the exhaust device (FIGS. 7, 8) arranged near the front side of the coach.

Both at the air exhaust side of the air heating device 10 and at the air exhaust side of the air heating device 11 a temperature sensor not shown has been arranged by means of which the position of the adjusting valve 16,17, respectively, can be influenced for adjusting the quantity of water which is supplied to the heating device 10 and to the heating device 11, respectively. In this manner it can be effected that independent of the quantity of air displaced per time unit through the heating device 10,11 respectively, the temperature of the air heated by means of the heating device 10,11, respectively, stays practically constantly on a set level of e.g. ±55° C.

In order to be able to ensure temperature measuring with the sensors 32 when in action the construction has been made such that the fans 21,22, and 26, 27 keep working with a minimum number of revolutions at all times, so that a certain displacement of air along the sensors 32 will always occur.

The minimum number of revolutions of said fans 21,22,26 and 27 arranged near the floor will only be reached when the outside temperature is so high that heating is no longer required. In that case the valve 19 is also automatically operated to interrupt the supply of hot cooling water from the engine to the heating units 10 and 11. At the same time the fans in the roof ducts 33 and 34 which are not used when the heating device is in action are set in operation, so that then all four fans 35, 36 are in action for supplying a sufficient quantity of fresh air.

In order to make a good flow of fresh air in the rear of the interior of the coach possible in the summer period, too, shut-off valves, not further illustrated, can be provided near the rear side of the coach near the roof, which are automatically opened when the fans, starting to operate when the heating device is switched off, have reached a certain number of revolutions.

When the vehicle is provided with an air conditioning plant the two fans, which only start operating when the heating units are switched off in the embodiment described above, can be left out as well as the valve which are opened dependent on the speed of revolutions of said fans. When there is an air conditioning plant present it will be automatically set in operation when the supply of hot water to the heating units is interrupted.

Normally air supplied via the roof ducts 33, 34 is not pre-heated. When being used in extremely cold conditions, however, means may be provided to pre-heat said air to 2°-3° C. before supplying it to the interior of the coach.

I claim:

1. A heating system for an enclosed vehicle having an engine, said vehicle including a roof, a floor opposite said roof, longitudinal side walls joining said floors and said roof, a front driver's section between said longitudinal side walls and said roof and said floor, and a rear enclosure opposite said front driver section and between said longitudinal side walls, said roof and said floor, said heating system comprising:

air supply ducts extending within said vehicle;

heating devices located generally rearwardly of said vehicle and in the vicinity of said floor and said longitudinal side walls, said heating devices being operable with said ducts such that air passing through said ducts is heated by said heating devices;

a suction pipe extending transverse of said side walls and near said floor, said suction pipe communicating with air outside of said vehicle;

fans connected between said suction pipe and said air ducts and between the inside of said vehicle and said air ducts, said fans being located near said floor and acting to suck air from said suction pipe and the inside of said vehicle and blow it into said air ducts past said heating devices;

temperature sensors distributed about the inside of the vehicle, said sensors being operable to reduce or increase the blowing capabilities of a respective one of said fans to control the amount of air being blown into said ducts.

2. The heating system of claim 1 wherein said ducts are located near the floor and further including additional ducts located near the roof, said ducts including exhaust openings near said floor and said additional ducts including exhaust openings located near said roof, said exhaust openings located near said roof communicating with air outside said vehicle, said exhaust openings located near said floor being located near said temperature sensors and insulated therefrom.

3. The heating system of claim 1 further including pipes connecting said heating devices to said engine, said heating devices being heated by water used in said engine.

4. The heating system of claim 3 further including a front heating device located at the front of the vehicle and which is adjustable by the driver of the vehicle to direct hot air along the front windows of the vehicle to prevent misting of the vehicle windows.

5. The heating system of claim 4 wherein said heating devices include a valve mechanism and further including additional ducts near said roof and additional fans near said roof and communicating with said additional ducts, said additional fans and said valve mechanism being responsive to said temperature sensors such that when said inside air reaches a predetermined temperature as sensed by said temperature sensors, said valve mechanism closes said pipes between said heating devices and said additional fans are activated to suck air from outside of said vehicle into said additional ducts.

6. The heating system of claim 1 including an air conditioning system which is connected to said additional ducts and activated when said valve mechanism closes said pipes between said engine and said heating devices.

7. The heating system of claim 4 further including a casing attached to the front of the vehicle and divided into two parts by a partition which has a closeable passage therein, said casing including openings on a first side opposite said partition through which air from the interior of the vehicle can flow and including a second side opposite said first side, said second side having openings communicating with the outside of said vehicle adjacent said side walls such that upon movement of said vehicle a suction action occurs at the second side of said casing, said suction being communicated through said partition when said passage is open to the inside of said vehicle.

8. The heating system of claim 1 wherein there are two fans located near the floor and adjacent two heating devices, one of said two fans sucking air from inside said vehicle and blowing it over one of said two heating devices into said duct, the other of said two fans sucking air from the outside of said vehicle through said suction pipe and blowing the air from outside of said vehicle across the other of said two heating devices into said ducts.

9. The heating system of claim 1, further including means for maintaining a higher air pressure inside the vehicle than the ambient air pressure outside the vehicle when the vehicle is moving forward.

10. The heating system as claimed in claim 1, characterized in that the air supply ducts extending along the floor are subdivided such that reheated air sucked from the interior of the vehicle by said fans can be recirculated and such that air sucked in from outside of said vehicle via said fans and said suction pipe can be blown into the vehicle.

11. The heating system as claimed in claim 10, wherein above said air supply duct located near the floor through which reheated air sucked from the interior of the vehicle is supplied, there is located near the roof a further air supply duct via which air sucked from the outside is supplied.

12. The heating system as claimed in claim 1, characterized in that near the floor, several openings are located one behind the other with reference to a major axis of the vehicle, said openings providing means through which air can be sucked for supply to the heating devices, whilst near said openings temperature sensors are provided which directly affect the speed at which the fans operate.

13. The heating system of claim 1 including non-return valves attached to said fans to control the direction of air flow.

14. A heating and ventilating system for use in a vehicle provided with a passenger room (1) bounded by a floor (2), a roof (4) and upright walls (3) as well as with a pair of air heating devices (10, 11), a fan (21,26), and air supply duct (8,9), for supplying outside air via each air heating device (10, 11) to said air supply duct which extends along a side of the vehicle at floor (2) level, whilst near each side of the vehicle a further fan (35, 36) is provided via which outside air can be supplied to another air supply duct (33,34) which is located near the roof and extends the longitudinal direction of the vehicle, said system further including additional fans (22,27) by which air can be sucked from the interior (1, 25) of the vehicle and can be supplied to said air supply ducts extending at floor level via said air heating devices (10,11) and means (32) for regulating the number of revolutions of the fans (21, 26, 35, 36) supplying outside air dependent on the demand for heat in such a manner that with a decreasing demand for heated air to be supplied, the number of revolutions of the fan (21, 26) supplying outside air via the heating device (10,11) decreases and the number of revolutions of said further fan (35,36) supplying outside air increases and with an increasing demand for heat the number of revolutions of the fan (21, 26) supplying outside air via the heating device (10, 11) increases and the number of revolutions of said further fan supplying outside air (35, 36) decreases, all this in such a manner that the quantity of outside air supplied per time unit stays at least substantially constant.

15. The heating and ventilating system as claimed in claim 14 wherein the air supply ducts (8, 9) which extend along the floor (2) are subdivided into compartments, whereby via one compartment of an air supply duct (8,9) reheated air sucked from the interior (1, 25) of the vehicle can be supplied and via another compartment heated outside air can be supplied, whilst the various compartments in the air supply ducts (8, 9) extending along both side walls (3) of the vehicle are arranged such that opposite a compartment of the one air duct (8) via which heated outside air can be supplied, a compartment of the other air duct (9) is located via which reheated air sucked from the interior (1,25) of the vehicle is supplied.

16. The heating and ventilating system as claimed in claim 15 wherein above the compartment of air supply duct (8, 9) located near the floor (2) via which reheated air sucked from the interior (1, 25) of the vehicle is supplied, there is located near the roof (4) a compartment of air supply duct (33, 34) via which air sucked from the outside is supplied.

17. The heating and ventilating system as claimed in claim 15 in a motorbus provided with a driver's seat (6), wherein near the driver's seat (6) an air exhaust opening (44) is provided via which air under pressure can escape.

18. The heating and ventilating system as claimed in claim 17 wherein said exhaust opening (44) is in an exhaust device which includes a casing (40) with a partition (41) comprising at least one non-return valve (45), whereby the room located at the one side of the partition (41) has a direct communication with the interior (1) of the vehicle and the room located at the other side of the partition (41) has a direct communication with an air supply opening (46) provided in the front side of the vehicle.

19. The heating and ventilating system as claimed in claim 14, wherein near the floor (2), at the level of the side walls (3), several openings (28) located one behind the other, disposed in the longitudinal direction of the vehicle, are provided via which air can be sucked for supply to the heating devices (10, 11), whilst near said openings (28) temperature sensors (32) are provided via which the number of revolutions of the fans (22, 27, 35, 36) can be influenced.

20. The heating and ventilating system as claimed in claim 14, wherein said fans (21, 22; 26, 27; 35, 36) cooperate with non-return valves (37), which have been provided in such a manner that they oppose a flow of air from the interior (1) of the vehicle via the fans.

21. The heating and ventilating system as claimed in claim 14, further including means for keeping only said further fans (35, 36) in action when the heating devices (10, 11) are switched off.

22. The heating and ventilating system as claimed in claim 14 further including means (19) for switching off the heating devices (10, 11) when the number of revolutions of the fans (21, 22, 26, 27) supplying air to the heating devices (10, 11) are reduced to a certain minimum number of revolutions by means of said regulating means (32).

23. A method for adjusting the temperature in a passenger room (1) bounded by a floor (2), a roof (4) and upright walls (3) in a vehicle, said method comprising the steps of supplying air near both longitudinal sides of the vehicle, near the floor (2) from outside via an air heating device (10, 11) to the passenger room (1) of the vehicle, supplying further outside air near the roof (4), regulating the quantity of outside air led through the air heating device (10, 11) dependent of the quantity of heat required to be supplied into the passenger room, keeping the passenger room (1) under excess pressure, supplying part of the air supplied via the air heating device (10, 11) from the interior (1, 25) of the vehicle, and keeping the total quantity of outside air supplied per time unit at least substantially constant.

24. The method as claimed in claim 23, wherein air is supplied at both sides of the longitudinal axis of the vehicle, both near the floor (2) and near the roof (4) via ducts (8, 9, 33, 34) extending into the longitudinal direction of the vehicle and arranged near the side walls (3), said ducts (8, 9, 33, 34) being provided with exhaust openings (38, 39) opening into the interior of the vehicle.

25. The method as claimed in claim 24 further including supplying heat outside air via part of the length of a duct (8, 9) located near the floor (2), supplying reheated air via another part of said duct sucked from the interior (1, 25) of the vehicle, whereby the construction is such that opposite a duct portion (8) located at the one longitudinal side of the vehicle via which heated outside air is supplied a duct portion (9) is located at the other side of the vehicle, via which reheated air sucked from the interior (25), is supplied.

26. The method as claimed in claim 23 wherein the temperature of the air sucked form the interior (1, 25) of the vehicle and to be supplied to the heating devices (10, 11) is measured (32) in several exhaust openings (28) located one behind the other with reference to a longitudinal direction of the vehicle, and arranged near both side walls (3) of the vehicle and the temperature measured in a certain point of measurement influences the number of revolutions (22, 27) of a fan cooperating with a heating device (10, 11) and supplying heated air to the passenger room (1) near the relevant point of measurement.

27. The method as claimed in claim 23 wherein used air is exhausted (40) near the front side of the vehicle.

28. The method as claimed in claim 24, further including supplying air into the passenger room via a duct portion (33,34) extending along a first side wall near the roof (4), which air is sucked from the outside, and supplying reheated air sucked from the interior of the vehicle and passed through an air heating device into the passenger room via a further duct portion (8,9) arranged in the same part of the passenger room as said first mentioned duct portion (33,34) and extending near the floor along the second side wall opposite said first side wall.

* * * * *